United States Patent [19]

Bikson et al.

[11] Patent Number: 4,990,165

[45] Date of Patent: Feb. 5, 1991

[54] PERMEABLE MEMBRANES FOR ENHANCED GAS SEPARATION

[75] Inventors: Benjamin Bikson, Brookline; James E. Miller, Waltham; Joyce K. Nelson, Lexington, all of Mass.

[73] Assignee: Union Carbide Industrial Gases Technology Corporation, Danbury, Conn.

[21] Appl. No.: 413,094

[22] Filed: Sep. 27, 1989

Related U.S. Application Data

[62] Division of Ser. No. 80,476, Jul. 31, 1987, Pat. No. 4,881,954.

[51] Int. Cl.$^5$ .................. B01D 53/22; B01D 71/68
[52] U.S. Cl. ..................................... 55/158; 55/16
[58] Field of Search .................. 55/16, 68, 158; 210/500.23, 500.41, 500.42

[56] References Cited

U.S. PATENT DOCUMENTS

| | | | |
|---|---|---|---|
| 3,133,132 | 5/1964 | Loeb et al. | 264/49 |
| 3,615,024 | 10/1971 | Michaels | 210/490 |
| 3,737,042 | 6/1973 | Boom | 210/321 |
| 4,177,150 | 12/1979 | Inoue et al. | 210/500 |
| 4,230,463 | 10/1980 | Henis et al. | 55/16 |
| 4,364,759 | 12/1982 | Brooks et al. | 55/16 X |
| 4,486,376 | 12/1984 | Makino et al. | 264/342 R |
| 4,527,999 | 7/1985 | Lee | 55/16 |
| 4,568,579 | 2/1986 | Watson | 55/16 X |
| 4,575,385 | 3/1986 | Brooks et al. | 55/158 |
| 4,664,681 | 5/1987 | Anazawa et al. | 55/16 X |

FOREIGN PATENT DOCUMENTS

| | | | |
|---|---|---|---|
| 215549 | 3/1987 | European Pat. Off. | |
| 58-058111 | 4/1983 | Japan | 55/158 |
| 59-112802 | 6/1984 | Japan | 55/158 |
| 59-169510 | 9/1984 | Japan | 55/158 |

*Primary Examiner*—Robert Spitzer
*Attorney, Agent, or Firm*—Alvin H. Fritschler

[57] ABSTRACT

Composite membranes are prepared by depositing a separation layer on an asymmetric support layer. The separation layer has a selectivity equal to or greater than that of the material of the asymmetric support layer for a desired gas separation. The support layer is desirable produced in non-asymmetric form, and exposed to an elevated temperature approaching the glass transition temperature of the support layer material under non-swelling conditions to modify the structure thereof to create asymmetry therein, before or after the deposition of the separation layer, and to increase its compaction resistance and collapse pressure. Such desirable properties are conveniently achieved on a repeatable basis, enhancing the uniformity and reliability of the treated support layer and of composite membranes produced therefrom, for use in gas separation operations.

15 Claims, No Drawings

४,९९०,१६५

PERMEABLE MEMBRANES FOR ENHANCED GAS SEPARATION

This application is a division of prior U.S. application Ser. No. 080,476, filed date July 31, 1987, now U.S. Pat. No. 4,881,954.

BACKGROUND OF THE INVENTION

1. Field of the Invention

The invention relates to permeable membranes for the separation of gases. More particularly, it relates to permeable membranes having enhanced gas separation/permeability characteristics.

2. Description of the Prior Art

Permeable membranes capable of selectively permeating one component of a gas mixture are considered in the art as convenient, potentially highly advantageous means for achieving desirable gas separations. For practical commercial operations, permeable membranes must be capable of achieving an acceptable level of selectivity of separation of the gases in a feed stream while, at the same time, achieving a desirably high productivity of gas separation.

Various types of permeable membranes have been proposed in the art for the carrying out of a variety of gas separation operations. Such membranes can generally be classified as being of the (1) isotropic, (2) asymmetric or (3) composite type. The so called isotropic and asymmetric type membranes are comprised essentially of a single permeable membrane material capable of selectively separating desired components of a gas mixture. Isotropic membranes have the same density throughout the thickness thereof. Such membranes generally have the disadvantage of low permeability, i.e. low permeate flux, due to the relatively high membrane thickness necessarily associated therewith. Asymmetric membranes are distinguished by the existence of two distinct morphological regions within the membrane structure. One such region comprises a thin, dense semipermeable skin capable of selectively permeating one component of a gas mixture. The other region comprises a less dense, porous, non-selective support region that serves to preclude the collapse of the thin skin region of the membrane under pressure.

Composite membranes generally comprise a thin layer or coating of a suitable permeable membrane material superimposed on a porous substrate. The separation layer, which determines the separation characteristics of the composite structure, is advantageously very thin so as to provide the desirably high permeability referred to above. The substrate only serves to provide a support for the tin membrane layer positioned thereon.

As the advantages of permeable membranes have become increasingly appreciated in the art, the performance requirements of such membranes have likewise increased. Thus, the art is moving in the direction of very thin membranes having desirable permeability characteristics without sacrifice of the separation, or selectivity, characteristics of the hollow fiber or other permeable membrane structure. It is thus increasingly desired that more advantageous combinations of permeability and selectivity be achieved with respect to a variety of as separations of commercial interest. As indicated above, isotropic type membranes are not generally suitable for the achieving of such requirements. Asymmetric membranes, on the other hand, can be developed for such practical gas separation applications, but do not possess an inherent flexibility enabling them to be readily optimized for particular gas separation applications. While the thin dense, semipermeable layer of a particular asymmetric membrane material can be made thinner for increased permeability, the selectivity characteristics of said material, unless modified by particular treatment techniques, may be no more than adequate with respect to the separation of the components of the gas being treated in the particular application.

The thin skin of conventional asymmetric membranes, such as are described in the Loeb patent, U.S. Pat. No. 3,133,132, is generally found not to be perfect, but to contain various defects. Such defects, in the form of residual pores, minute pinholes and the like, comprise relatively large size openings through which the feed gas passed to a membrane of such material will preferentially flow. As a result, a significantly reduced amount of gas separation due to the interaction of the feed gas with the material of the permeation membrane itself will occur as a result of the presence of such defects in the membrane structure. In the case of asymmetric polysulfone hollow fibers such defects result in the selectivity for $O_2/N_2$ separation being only in the range of about 1–1.5 as contrasted to a selectivity for $O_2/N_2$ of about 6.0 for polysulfone that is free of defects. As used herein, it will be understood that the selectivity, or separation factor, of a membrane or membrane module assembly, represents the ratio of the permeate rate of the more readily permeable component to the less readily permeable component of a particular gas mixture. In a proposed solution to this problem, Henis et al., U.S. Pat. No. 4,230,463, disclosed the coating of the asymmetric membrane with a coating material having a determined intrinsic separation factor that is less than that of the material of the separation membrane. The resulting multicomponent membrane was found to exhibit a separation factor significantly greater than the determined intrinsic separation factor of the material of the coating and greater than the separation factor exhibited by the uncoated separation membrane. Using this approach, silicone, having a selectivity for $O_2/N_2$ separation of about 2, can be coated on polysulfone hollow fibers to increase the $O_2/N_2$ selectivity thereof from the 1–1.5 range indicated above to from 2 to 6, with such $O_2/N_2$ selectivity commonly approaching 6. The permeability (as defined below) of such silicone/polysulfone composites have generally been relatively low, i.e. about 0.2 ft$^3$ (STP)/ft$^2$. day . psi. or less, leading to the desire for thinner membranes, i.e. thinner dense skins, particularly in light of the increasing requirements in the art for high flux operation. Thinner membranes lead, however, to an increase in the number of defects that require curing to achieve acceptable performance. While efforts to improve this approach continue, there remains a desire in the art for the other approaches to provide a desirable combination of selectivity and permeability for practical commercial operation. For such reasons, composite membranes, utilizing membrane materials selected particularly for a desired gas separation, offer the greatest opportunity, with respect to particular gas separations of commercial interest, for the achieving of desirable combinations of selectivity and permeability. It will be appreciated that composite membranes, to achieve the performance requirements desired in the art, must not only incorporate very thin membrane layers, but must comprise separation layer-substrate structures of optimum advantage for a desired gas separation operation. Illustrative examples of the wide variety of practical commercial operations in which composite membranes may be advantageously employed include air separation, the recovery of hydrogen from ammonia purge gas and from refinery streams, carbon dioxide and methane separations on a variety of operations, helium and methane separations, and the like.

There is a genuine need and desire in the art, therefore, to develop unique composite type membranes capable of providing enhanced gas separation in practical commercial operations. It is also desired in the art that the processes for producing such composite membranes be improved so as to enhance the effectiveness and reliability of such membranes.

It is an object of the invention, therefore, to provide permeable membranes having enhanced gas separation characteristics.

It is another object of the invention to provide composite membranes having advantageous combinations of selectivity and permeability for desired gas separations.

It is a further object of the invention to provide a process for the preparation of improved permeable membranes having enhanced effectiveness and reliability.

With these and other objects in mind, the invention is hereinafter described in detail, the novel features thereof being particularly pointed out in the appended claims.

SUMMARY OF THE INVENTION

Composite membranes having enhanced gas separation characteristics are prepared by coating a porous support layer in asymmetric form with a separation layer having a greater gas separation selectivity than that of the material of the asymmetric support layer. The preferred support layer has improved compaction resistance and collapse pressure characteristics as a result of the exposure of a porous support layer, in dry form, to an elevated temperature approaching the glass transition temperature of the support layer material under non swelling conditions. The thus-formed asymmetric support layer can, itself, be used as a permeable membrane apart from its preferred use in composite membranes. The permeable membranes of the invention can be used for a variety of gas separation operations in which enhanced combinations of selectivity and permeability can be achieved with respect to the feed gas components desired to be separated.

DETAILED DESCRIPTION OF THE INVENTION

The objects of the invention are accomplished by combining the advantageous features of composite and asymmetric type permeable membranes, and by providing improved asymmetric membrane materials having enhanced uniformity and reliability for use as the support layer of improved composite membranes or as improved asymmetric membranes. Desirable gas separations can be achieved using the permeable membranes of the invention, with advantageous combinations of selectivity and permeability being achievable in practical gas separation operations.

Multi-layer membranes have been prepared, as noted in the Henis et al. patent referred to above, by coating asymmetric membranes with coating materials that possess lower selectivity, or separation factors, than the asymmetric substrate material, thereby obtaining separation factors of the coated membrane close to that of said substrate material. It is also well known in the art to prepare composite membranes by coating relatively porous, highly permeable substrates, i.e. support layers, with coating materials that possess either high or low selectivity characteristics with correspondingly low or high permeability characteristics, respectively. However, examples of asymmetric membranes coated with coating materials having equal or higher selectivity properties than those of the asymmetric substrate materials have not been indicated in the art. The reasons for this are believed to be twofold, i.e. (a) that the coating of an asymmetric substrate with high selectivity materials, which commonly have low permeability characteristics, has heretofore resulted in unacceptably low permeate rates for the final composite membrane product, and (b) that common asymmetric substrate materials, such as polysulfone, cellulose acetate, and the like, are solvent sensitive, and difficulty has been encountered in selecting solvent systems for the coating of such materials with high selectivity coatings that, upon application, do not damage the structure of the asymmetric substrate. It has now been discovered that polysulfone and other polymeric membrane materials having relatively high glass transition temperatures can be treated at temperatures close to said glass transition temperature, with resultant increase in compaction resistance and membrane collapse pressure.

This annealing treatment can be carried out so as to result in mostly surface modification of the material, or it can be carried out so as to cause modification throughout the entire membrane structure. Asymmetric membranes formed by said annealing treatment, and subsequently coated with polymeric materials possessing separation characteristics equal to or higher than that of the treated asymmetric substrate, have showed superior pressure compaction resistance. This is of particular significance with respect to permeable membrane gas separation processes carried out at high pressures and temperatures, as membrane compaction can result in a loss of permeation and separation characteristics or even in a total membrane collapse.

It was further unexpectedly discovered that composite membranes prepared utilizing asymmetric substrates prepared by the annealing treatment of the invention exhibit an advantageous and superior combination of selectivity and permeability characteristics. This highly desirable result is made possible by the reduced solvent sensitivity of the treated asymmetric membrane materials of the invention. Thus, asymmetric substrates prepared by the annealing treatment of the invention can be effectively coated with various high selectivity materials available in solvent systems ordinarily detrimental to the substrate. By contrast, conventional asymmetric substrates of the same material, being generally solvent sensitive, would tend to be damaged if coated with such solvent systems.

The permeable membranes prepared in accordance with the invention, either composite membranes having a treated asymmetric support layer, or such treated asymmetric material itself, can be prepared in any desired form or configuration suitable for use in a particular gas separation Hollow fiber membranes are a generally preferred form of membrane for purposes of the invention. It will be understood, however, that the membranes of the invention can be prepared in spiral wound, flat sheet or other desired forms for particular applications. It will be further understood that such membranes can be prepared by any known, convenient techniques in the art, with such membranes preferably being subjected to the annealing treatment as herein disclosed and claimed.

It will be understood that the membranes prepared as herein disclosed and claimed can be employed, depending upon their separation characteristics and the requirements of a given application, for a wide variety of practical gas separation operations in which it is desired to separate a more readily permeable component of a feed gas mixture from a less readily permeable component thereof. For this purpose, the feed gas mixture is contacted with the feed side of the membrane having desirable gas separation characteristics. The more readily permeable component of the feed gas mixture is withdrawn from the membrane as a permeate stream, and the less readily permeable component is separately withdrawn as a non-permeate stream. Representative of the various gas separations for which permeable membranes can be used to advantage are applications in which the feed gas is air, oxygen is the more readily permeable component thereof for particular membranes, and is withdrawn as permeate gas, and nitrogen is the less readily permeable gas, and a nitrogen enriched gas is withdrawn as non-permeate gas; applications in which the feed gas mixture comprises a mixture of hydrogen and nitrogen, said permeate gas comprises hydrogen and said non-permeate gas comprises nitrogen; and applications in which said feed gas mixture comprises a mixture of carbon dioxide and methane, said permeate gas comprises carbon dioxide and said non permeate gas comprises methane.

It will be appreciated that the membrane material treated in accordance with the invention may comprise any such material having a relatively high glass transition temperature, generally higher than 100° C., e.g. polysulfone, polyphenylene sulfide, cellulose acetate and the like, with polysulfone being generally preferred from an overall technical-economic basis.

The polysulfone or other hollow fiber substrates employed in the practice of particular embodiments of the invention can be prepared in accordance with conventional techniques well known in the art. Hollow fibers are generally spun from a dope composition of the desired fiber polymer, quenched and washed. As disclosed by Cabasso et al. in "Composite Hollow Fiber Membranes", Journal of Applied Polymer Science, Vol. 23, 1509–1525 (1979), polysulfone hollow fibers can be spun from a ternary solution of polysulfone poly(vinylpyrrolidone) and dimethylacetamide, with the total polymeric concentration in the solution desirably being 40–52 wt. %, and the polysulfone/poly(vinylpyrrolidone) ratio being 1.5–2.0. The well known tube-in-tube jet technique is disclosed as being suitable for the spinning procedure, with water at about 21° C. being the preferred outside quench medium for the fibers. The quench medium in the center of the fiber is desirably air. Quenching is followed by washing the fibers, conveniently with hot water at about 50–60° C. Following such washing, the hollow fibers are dried prior to being coated with the membrane material to form the desired composite membrane For this purpose, the polysulfone hollow fibers are typically dried by passage through a hot air drying column for a suitable period of time.

In conventional practice for the preparation of composite membranes, the dried polysulfone or other hollow fiber is coated with a desired coating composition in a coating and drying sequence. This coating and drying sequence conveniently comprises the technique described in the Coplan et al. patent, U.S. Pat. No. 4,467,001. Thus, the dried hollow fiber is passed through the coating solution contained in a coating vessel, and is then passed through a dryer oven and a cure oven for contact with drying air or other suitable gas, and higher temperature curing air or other gas prior to being taken up on a winder or otherwise being processed or stored for eventual incorporation in membrane modules suitable for use in commercial gas separation operations. For the various embodiments of the invention, the drying and curing conditions will be adapted to the requirements of the particular materials being employed. It will be appreciated by those skilled in the art that it may also be possible to dry the separation layer on the support layer without the need for employing the separate curing step described above.

In the practice of the invention, the substrate or support layer of composite membranes as first formed in the desired configuration is generally porous in nature and essentially not of asymmetric character, although it may exhibit some degree of asymmetry without departing from the scope of the invention. The polysulfone hollow fibers generally preferred as the substrate for use in gas separations, and other suitable substitutes, will thus be prepared initially in such essentially non-asymmetric form, and will typically have a surface porosity in excess of about $10^{-3}$ of the total surface area. By contrast, asymmetric membranes typically have a surface porosity of less than about $10^{-5}$, preferably less than about $10^{-6}$. Those skilled in the art will appreciate that the surface porosity of the desired substrate can be adjusted by variation of the operating conditions pertaining to the formation of the substrate. In the production of polysulfone or other hollow fibers, for example, the surface porosity of the fibers will be determined by the composition of the casting solution, the temperature employed, and other process parameters, such as the length of the air gap employed in dry wet spinning procedures, the rate of spinning, the fiber draw ratio, and the like.

In the practice of the prior art, it will be understood that hollow fibers or other substrate configurations can be prepared initially in asymmetric form by the appropriate use of particular spinning procedures and adjustment of the operating factors referred to above. Unless very close control of the operating factors is carefully maintained, adding to the processing complexity of the overall membrane production operation, however, the surface of the membrane layer, or portions thereof, may have a greater porosity than is desired in an asymmetric membrane, e.g. said surface porosity may be on the order of $10^{-4}$. Because of such operational complexities, solvent annealing processes, alone or in combination with heating, have also been employed in the art for the production of asymmetric membranes. Such membrane solvent annealing processes are used to modify membrane porosity, with resulting change in the permeability, or flux, and the selectivity, or separation, characteristics of membranes that have either been spun or otherwise prepared initially in non asymmetric or in a less than fully satisfactory asymmetric form. Such solvent annealing frequently also results in densification of the membrane material, with increase in compaction resistance and collapse pressure. Asymmetric polysulfone membranes and asymmetric cellulose acetate membranes are frequently modified using solvent annealing techniques. However, solvent annealing frequently results in unacceptable losses in permeation rates. Furthermore, solvent annealing techniques frequently result in a decrease, rather than an increase, in compaction resistance of the membrane material so treated, due to residual solvent left within the membrane matrix. In any event, the procedures of the art for forming a membrane layer in asymmetric form, or for modifying a membrane to impart asymmetry thereto, are not effective in achieving a desired asymmetric form of membrane having a consistently low surface porosity, coupled with satisfactory compaction resistance and collapse pressure. Furthermore, the asymmetric membrane of the art will tend to have some residual porosity of unacceptably large diameter. As a result, a higher concentration of coating must be used, and a greater thickness of coating, or separation layer, must be deposited in order to assure breaching of the pores in the membrane surface with the coating material. Because of such requirements leading to excessive coating thickness, it has not heretofore been possible to achieve advantageous combinations of selectivity and permeability by the coating of any asymmetric support layer with a coating having selectivity equal to, or greater than, that of the support layer material. The fact that coating materials of high selectivity tend to have low permeability will be seen to further compound this problem.

In the practice of the invention, it has been found that polysulfone membranes, and other membranes having high glass transition temperatures rendering them suitable for use under practical gas separation conditions, can be subjected to a particular annealing process to advantageously increase the compaction resistance and membrane collapse pressure thereof. Thus, the membranes can be annealed by exposure, for a short period of time, to a high temperature close to their glass transition temperatures under non-swelling conditions. The annealing process treatment can be employed so as to result in mostly surface modification, thus creating an asymmetric membrane layer, or can be carried out over a somewhat longer period of time so as to cause modification throughout the entire membrane structure. In either event, it will be appreciated that the process is carried out over a sufficiently brief period of time to avoid causing the collapse of said membrane structure. As noted above, the membrane layer treated by the annealing process of the invention, and converted to a desirable asymmetric form, can itself be used as an improved asymmetric membrane suitable for gas separation operations. As such, it will possess superior compaction resistance and collapse pressure properties. Furthermore, such results can be achieved effectively on a repeatable basis, enhancing the uniformity and reliability of the treated membrane. The invention thus overcomes the deficiencies associated with conventional annealing techniques.

The advantageous asymmetric membrane layer, prepared in accordance with the invention, is preferably employed as the support layer of a composite membrane containing a coating adapted to the overall selectivity and permeability requirements of a given application. The separation layer coated on the outer surface of the skin region of the asymmetric support layer has a selectivity for the more permeable component of a feed gas mixture that is equal to or greater than that of the material of the support layer. The resulting composite membrane thereby exhibits separation characteristics equal to or higher than the intrinsic separation characteristics of the material of the asymmetric support layer. The separation layer thus determines, to a great extent, the separation characteristics of the composite membrane. Since the skin region of the support layer is thin and does not contribute substantially to the total resistance to gas flow, it is also possible to use lower concentration coatings and to apply thinner separation layers to the support layer than has heretofore been feasible in the art. Because of the ability to effectively utilize very thin coatings less than about 0.4 microns, preferably less than 0.2 microns, or, alternatively, to deposit a coating that is asymmetric in nature itself with a separation barrier or layer of less than about 0.2 microns in thickness, the permeability of the resulting composite membrane can be very significantly enhanced. It is because of this beneficial feature of the invention that high selectivity coatings can be effectively employed to prepare composite membranes having enhanced selectivity and advantageous combinations of selectivity and permeability not heretofore attainable using conventional asymmetric membrane layers.

The exposure of the membrane material initially in essentially non asymmetric form to an elevated temperature under non swelling conditions to accomplish the desired annealing treatment can be achieved in a suitable and convenient manner. In one embodiment of the invention, the membrane is exposed to a hot gas atmosphere, the components of which do not cause the swelling of said membrane material. Hot air being a generally preferred atmosphere for membranes not easily oxidizable. It will be understood that inert gas atmospheres, such as nitrogen or argon atmospheres, can also be used in the practice of the invention. When the membrane material, either the separation membrane itself or comprising the support layer for a composite membrane, is in hollow fiber form, it is convenient to pass the hollow fibers through a heated gas zone prior to being passed to a drying and/or curing zone referred to above. It should be noted that the non swelling conditions referred to herein comprise an essentially non solvent environment with respect to the membrane material so as to prevent excessive densification of the porous structure, or uncontrollable distortion or even collapse of the membrane body. When air or inert gas are employed in the annealing treatment, it is within the scope of the invention to expose the hollow fiber or other desired form of membrane to the non-swelling conditions for a relatively short period of time, such as from about 5 seconds to about 5 minutes, e.g. from about 30 seconds to about 4 minutes to achieve the desired surface modification or modification throughout the membrane layer being treated. It will be appreciated that the non-swelling gas atmosphere serves to transfer heat to the membrane for said annealing process purposes, and is not intended to chemically react with or cause a swelling of the membrane structure.

Employing the non-swelling gas atmosphere embodiment of the invention, the membrane is exposed to said non-swelling conditions at a temperature approaching, but not reaching, the glass transition temperature, or softening point, of the membrane material. Thus, the operating temperature will be up to about 20° C. less, preferably from about 15° C. to about 1° C. less, than said glass transition temperature. Such exposure to elevated temperature is carried out for such a limited period of time, as indicated above, to affect a desired modification of the membrane structure, but without causing a collapse of said membrane.

It should also be appreciated that, in the practice of the invention, other means can also be provided for supplying the high temperature, non-swelling conditions desired for the effective annealing of the membrane. For example, a hot non-swelling, and preferably, but not necessarily, a non-wetting liquid can be employed as a bath through which the membrane being treated is passed for a sufficient time to accomplish the desired modification of the membrane structure without causing the collapse thereof. Silicone oil is an advantageous liquid for use in the treatment of polysulfone membrane. Other suitable liquids, such as high molecular weight hydrocarbons, e.g various synthetic hydrocarbon oils, can be employed in other embodiments of the invention. It will be appreciated that the thus-treated membrane will generally be washed and dried following such treatment with a non swelling liquid.

The treated membrane of the invention, in desirable asymmetric form, can either be used, by itself, as an asymmetric membrane, or can be used as a support layer for composite membranes. The practice of the invention enables a high degree of asymmetry to be effectively achieved on a consistent, repeatable basis. Thus, the outer surface of the relatively dense skin portion of the asymmetric membrane layer will be found to contain only a very small amount of minute imperfections. The residual pores of the membrane layer are of the angstrom size range and generally appear to be no larger than several tens of angstrom at most. The amount of such residual pores is also very small so that the surface porosity of the treated layer, i.e. the ratio of the surface occupied by pores to the total surface area of the layer, is consistently and generally uniformly less than about $10^{-5}$, generally less than about $10^{-6}$.

Because such desired degree of asymmetry is readily achievable on a consistent, repeatable basis in the practice of the invention, the coatings applied to the treated asymmetric layer employed as a support layer to form a composite membrane can be made very thin, particularly since the smooth surface of the asymmetric is substantially free of occlusions. Separation layer thickness of about 0.4 microns or less are thus feasible in the practice of the invention, although it will be understood that it is also within the scope of the invention to employ a somewhat thicker coating if suitable with respect to the requirements of a particular gas separation operation. The ability to employ such thin separation layer coatings enables the composite membranes of the invention to achieve, in preferred embodiments, high selectivity coupled with permeabilities substantially higher than those generally achievable in the conventional composite membranes of the art at such levels of selectivity.

The asymmetric support layer of the invention can be coated with a coating having a lower selectivity than that of the support layer itself. Because of the high degree of asymmetry obtainable in the practice of the invention, however, it will be appreciated that the use of a lower selectivity coating in order to produce a multi-layer or composite membrane having selectivity characteristics determined by the selectivity of the substrate material is generally not necessary or beneficial. As noted above, coating the substrate with a low selectivity material generally provides a multicomponent membrane with a separation factor slightly lower than the intrinsic separation factor of the material of the asymmetric membrane substrate. A highly significant advantage of the invention, on the other hand, resides in the successful coating of a separation layer having a selectivity equal to or greater than that of the asymmetric support layer of the invention to achieve advantageous combinations of selectivity and permeability. As also noted above, the enhanced permeability of the composites of the invention are achieved because of the very thin coatings that can be successfully employed in the practice of the invention.

In the preferred composite membranes of the invention, the separation factor of the coating will thus be equal to, or preferably greater than, the separation factor of the substrate or support layer. The coating layer can be selected to provide an advantageous combination of enhanced selectivity and permeability for a given application. The smooth surface of the asymmetric support layer of the invention not only enables very thin coatings to be employed, but is found to possess a high degree of solvent resistance. It is this latter property that enables the asymmetric layer of the invention to be coated with a relatively harsh coating solvent system, since the solvent system may not penetrate into the substrate to a great extent and the dense substrate surface is exposed only briefly to the harsh solvent system.

While a variety of other polymeric materials, such as cellulose acetate, polyphenylene sulfide and the like can be used as an asymmetric membrane or as the enhanced asymmetric support layer for the composite membranes of the invention, polysulfone is the generally preferred material for use in the hollow fibers or other desired substrates of the invention. It will be appreciated from the above that the separation factor of an asymmetric polysulfone membrane layer will vary depending upon the gas mixture being separated in any given application. For oxygen/nitrogen separations, polysulfone will have a separation factor of about 6, with oxygen being the more readily permeable component of a feed air stream. For hydrogen/ nitrogen separations, polysulfone will have a separation factor of about 60, while it will have a separation factor of about 70 for helium/nitrogen operations. Because of the ability of the asymmetric support layer prepared by the annealing treatment of the invention to tolerate relatively harsh coating solvent systems without damage or alteration to the structure of said support layer, coatings can be successfully deposited on asymmetric polysulfone or other substrates from a variety of solvent systems, such as, for example, acetic acid/isopropyl alcohol, acetic acid/isopropyl alcohol/water, acetic acid/water, nitromethane, carbon tetrachloride/cyclohexane, carbon tetrachloride, methoxyethanol and the like.

In the composite membranes of the invention, high selectivity coating materials such as cellulose acetate, polyarylates or modified polyarylates, e.g., sulfonated polysulfone and brominated polyphenyleneoxide, polymethyl-methacrylate, and others can be employed. Because very thin layers of such coatings can be employed in the practice of the invention, the resulting composites are found to possess the high selectivity-high permeability characteristics desired for enhanced gas separation operations. To illustrate the higher selectivity of compositions that can be coated or otherwise deposited on polysulfone substrates, a cellulose acetate coating will have separation factors of about 6-7, 70-80 and 120-140, respectively, for the oxygen/nitrogen, hydrogen/nitrogen and helium/nitrogen separations referred to above with respect to polysulfone itself. The separation factors of sulfonated polysulfone for such particular separations are about 7, 200 and 200, respectively.

The invention is further described herein with reference to illustrative examples thereof. In such examples, the permeability of a membrane is expressed in terms of $ft^3$ of permeate gas at standard temperature and pressure $(STP)/ft^2$ . day . psi., and the selectivity or separation factor, is as defined above. In the examples, polysulfone hollow fibers were spun, quenched and washed in water. The fibers were then passed through a drying oven to achieve essentially dry conditions prior to being subjected to the annealing treatment of the invention. Except as otherwise noted, the treated fibers were coated to form a composite membrane and were passed through drying and curing ovens before being taken up on a suitable winder. The coated hollow fibers were further constructed into hollow fiber separatory modules in accordance with known procedures for convenient use in gas separation operations.

EXAMPLE 1

Using the Cabasso et al. approach referred to above, polysulfone hollow fibers were spun in essentially non-asymmetric form and were washed with hot water at about 50°–60° C. The thus-spun polysulfone hollow fibers were dried at about 115° C. by passage through a hot air drying column. The fibers were then annealed by being passed through another hot air oven at a temperature of about 182° C., close to the glass transition temperature of said polysulfone, which is about 194°–196° C. The residence time of the fibers being treated in the oven was 10 seconds. The annealing treatment of the invention was found to significantly change the gas permeation characteristics of the hollow fibers. The thus-dried and annealed polysulfone hollow fibers were tested using a mixed gas feed of 70% hydrogen/30% nitrogen at 25° C. and 25 psig. The permeation rate of hydrogen permeated gas was 10 $ft^3$ $(STP)/ft^2$ . day . psi., and the selectivity was 3.3 $H_2/N_2$. By contrast, when the non asymmetric hollow fiber in its unannealed form was tested under analogous conditions, the permeate rate of hydrogen was 140 $ft^3$ $(STP)/ft^2$ . day . psi, indicating a highly porous material, but with practically no selectivity for gas separation, i.e. only 1.3 $H_2/N_2$. Thus, the annealing treatment of the invention results in the conversion of the non-asymmetric, polysulfone hollow fibers into an asymmetric form having a desirable selectivity for hydrogen/nitrogen separation and an advantageous balance of permeability selectivity characteristics.

EXAMPLE 2

Following the preparation procedure as in Example 1 above, polysulfone hollow fibers annealed at various temperatures were coated with a cellulose acetate polymer coating composition and dried, using the technique described in the Coplan et al. patent, U.S. Pat. No. 4,467,001. The coating composition was prepared by dissolving 1.3% of Eastman Chemicals Grade CA-398-10 cellulose acetate in acetic acid/isopropanol/water in the portions of 40/40/20 by volume. The solution was filtered through a 1.5μm glass filter prior to application. The resulting cellulose acetate composite membrane was tested for its gas permeation characteristics with pure hydrogen and nitrogen at 200 psig and 25° C., with the results being summarized in Table 1 below:

TABLE 1

| Annealing Temperature °F. | Original Properties | | Properties after Exposure to $H_2/N_2$ Feed Stream for 16 Hours at 1,000 psig | | |
|---|---|---|---|---|---|
| | Permeability ($H_2$) | Selectivity ($H_2/N_2$) | Permeability ($H_2$) | Selectivity ($H_2/N_2$) | % Loss of Permeation after Compaction |
| Non-Annealed (Control) | 0.251 | 37 | 0.157 | 50 | 37 |
| 300 | 0.216 | 69 | 0.143 | 119 | 34 |
| | 0.224 | 69 | 0.147 | 117 | 34 |
| | 0.228 | 58 | 0.146 | 104 | 36 |
| 320 | 0.233 | 67 | 0.152 | 111 | 35 |
| | 0.242 | 68 | 0.164 | 110 | 32 |
| 340 | 0.266 | 53 | 0.178 | 80 | 33 |
| | 0.265 | 52 | 0.182 | 85 | 31 |
| 360 | 0.337 | 52 | 0.275 | 81 | 18 |
| | 0.343 | 55 | 0.286 | 65 | 17 |

As can be seen from the results of Table I, the selectivity and permeability characteristics of the composite cellulose acetate hollow fiber membrane prepared from a polysulfone hollow fiber annealed precursor substrate prepared in accordance with the invention were significantly enhanced. The results also illustrate that said composite membrane of the invention improved compaction resistance in gas separation use over the corresponding composite membrane prepared utilizing non annealed polysulfone hollow fibers precursor as the substrate. Thus, the percent loss in permeation rate after 16 hours of use in hydrogen/nitrogen feed gas separation at 1,000 psig was 37% for the composite membrane prepared from non-annealed polysulfone hollow fiber, but only 17% for the composite membrane prepared using the polysulfone hollow fiber substrate annealed at 360° F.

EXAMPLE 3

Annealed polysulfone hollow fibers were prepared as in Example 1 and were coated with cellulose acetate as in Example 2, with the coating being applied continuously by drawing the fibers through a die applicator, whereupon the fiber entered a drying oven set at 150° F. The coating solution had been prepared by dissolving 0.4% cellulose acetate in acetic acid/isopropanol in a 50/50 by volume mixture. The coating solution was filtered through a 1.5gm glass filter prior to being coated on the fiber. The air separation properties of the composite membrane are summarized and compared, in Table 2 below, with the properties of a composite membrane prepared by coating an unannealed polysulfone precursor substrate.

TABLE 2

| Pressure (psig) | Non-Annealed (Control) | | Annealed at 360° F. | |
|---|---|---|---|---|
| | Permeability ($O_2$) | Selectivity ($O_2/N_2$) | Permeability ($O_2$) | Selectivity ($O_2/N_2$) |
| 300 | 0.109 | 2.4 | 0.049 | 5.5 |
| 600 | 0.096 | 2.2 | 0.044 | 5.5 |
| 900 | 0.074 | 2.1 | 0.038 | 5.4 |
| 1200 | 0.046 | 2.5 | 0.030 | 5.5 |
| 1500 | 0.032 | 3.0 | 0.026 | 5.8 |
| 900 | 0.039 | 3.5 | 0.032 | 6.1 |
| 300 | 0.042 | 4.1 | 0.041 | 6.2 |

The air separation characteristics of the membranes were measured with compressed air at a stage cut of 1%. The composite membrane prepared in accordance with the teachings of the invention and the comparative membrane control sample were subjected to an increased sequence of pressure exposure of approximately an hour at the pressures indicated in Table 2 and were subsequently returned to and tested at the original low pressure conditions to determine the extent of deterioration of membrane properties. The separation factor for the composite membrane prepared from the annealed hollow fiber thus had, throughout all experiments, an average mean value of 5.7, while the separation factor for the composite membrane prepared from the non-annealed hollow fiber had a separation factor average mean value of only 2.5. Increasing the test pressure from 300 psig to 1500 psig resulted in a decrease in membrane permeability for the composite membrane prepared from the non-annealed hollow fiber membrane of about 70%, while the composite membrane prepared from the annealed hollow fiber showed a decrease in permeability of only 47%. Furthermore, when the test pressure was lowered to the original value of 300 psig, the permeability for the composite membrane prepared from the non-annealed hollow fiber was found to have decreased by about 60%, from the initial value, while the composite membrane prepared in accordance with the invention from the annealed hollow fiber was found to have decreased by only by 16%.

EXAMPLE 4

Annealed polysulfone was prepared as in Example 1 and coated as in Example 2, except that the solution was composed of 0.75% cellulose acetate dissolved in nitromethane. The thus prepared composite membrane was tested for gas separation characteristics, using a mixed gas feed comprising 10% helium and 90% nitrogen at 400 psig and 25° C.. The selectivity between helium and nitrogen was 82, and the permeation rate of helium was 0.88.

EXAMPLE 5

Annealed polysulfone was prepared as in Example 1 and coated as in Example 2, except that the solution was composed of 1.0% polymethylmethacrylate, supplied by Polysciences, Inc., Cat. No. 4552, dissolved in a mixture of acetic acid/isopropanol (50/50 by volume). The thus-prepared composite membrane exhibited the following gas separation characteristics when tested with a mixed gas feed comprised of 70% hydrogen and 30% nitrogen at 200 psig and 25° C.: the selectivity between hydrogen and nitrogen was 186, and the permeation rate for hydrogen was 0.46.

EXAMPLE 6

Annealed polysulfone was prepared as in Example 1 and coated as in Example 2, except that the solution was composed of 1.0% brominated polyphenylene oxide dissolved in a mixture of carbon tetrachloride/cyclohexane (50/50 by volume) and was prepared in accordance with the teaching of the Hay patent, U.S. Pat. No. 3,262,911 with 15% bromination of said polyphenylene oxide. The thus prepared composite membrane exhibited the following gas separation characteristics when tested with a mixed gas feed comprised of 70% hydrogen and 30% nitrogen at 200 psig and 25° C.: the selectivity between hydrogen and nitrogen was 46, and the permeation rate for hydrogen was 1.7.

EXAMPLE 7

Annealed polysulfone was prepared as in Example 1 and coated as in Example 2, except that the solution was composed of 1.0% sulfonated polysulfone dissolved in methoxyethanol, prepared in accordance with the Bikson et al. patent, U.S. Pat. No. 4,508,852. The thus prepared composite membrane exhibited the following gas separation characteristics when tested with a mixed feed gas comprised of 70% hydrogen and 30% nitrogen at 200 psig and 25° C.: the selectivity between hydrogen and nitrogen was 108, and the permeation rate for hydrogen was 0.53.

Those killed in the art will appreciate that the particular coating material and solvent composition and the substrate employed in the practice of various embodiments of the invention will depend upon the overall circumstances pertaining to any given gas separation operation. Thus, the gases to be separated, the selectivity and permeability requirements of the separation, the desired substrate material to be employed, the degree of sensitivity of the substrate to various solvents, the applicable operating conditions, including the temperature and the pressure requirements on the feed and permeate sides of the membrane, the coating thickness employed, the overall economics of the gas separation operation and the like. In the examples above, the relatively harsh coating solvent systems employed are ones tending to be detrimental to conventional polysulfone substrates untreated by the annealing process as herein disclosed and claimed. It is indeed surprising that these solvent systems could be used without adversely altering the physical morphology of the substrate. The practice of the invention, however, enables such coating-solvent systems to be advantageously employed to produce composite membranes having asymmetric substrates desirably coated with coating materials having a selectivity equal to, or higher than, that of the asymmetric substrate itself.

Those skilled in the art will appreciate that various changes can be made in the details of the invention as herein described without departing from the scope of the invention as set forth in the appended claims. Thus, the invention has been described and illustrated herein with respect to generally preferred embodiments, wherein the spun hollow fiber, or other desired form of membrane, is initially produced in essentially non-asymmetric form and is subjected to the recited non-swelling annealing treatment to form asymmetry therein prior to the deposition of a separation layer on the thus-asymmetric substrate. It is also within the scope of the invention, however, to coat the hollow fiber or other desired form of membrane, or to otherwise deposit a desired separation layer thereon prior to carrying out the annealing treatment of the invention. In such latter embodiments, the coated fibers or other composite structure can be conveniently annealed as by passage through a hot air oven at a suitable temperature and residence time. In the use of the membranes of the invention in gas separation operations, various processing alternatives can likewise be employed. For example, it is common practice to pass a feed gas mixture to be separated to the outer side of a hollow fiber membrane for contact with the separation layer portion thereof positioned on the outer side of the hollow fiber. Permeate gas passing through said separation layer passes also through the support layer portion of the membrane for exit through the bores of the hollow fibers comprising the membrane. It is also feasible, however, to pass the feed gas mixture through the bore of the hollow fibers for passage initially through the support layer and then through the outer separation layer portion of the membrane for discharge on the outer side of the membrane. It is also possible, in the use of hollow fiber membranes, to position the separation layer portion of the membrane on the inner side of the hollow fiber adjacent the bore of the fibers rather than on the outer surface thereof.

The invention will be seen to constitute a highly significant advance in the permeable membrane art. It enables the performance levels and flexibility heretofore achieved through the use of composite-type membranes to be further enhanced, providing an ever expanding scope of important gas separation operations that can be efficiently and effectively satisfied by the highly convenient and desirable permeable membrane technology, which is increasing an important factor in the gas separation considerations of a wide variety of practical commercial applications.

What is claimed is:

1. An asymmetric membrane having enhanced gas separation characteristics comprising a relatively thin dense semipermeable skin region and a less dense, porous non-selective support region that serves to preclude the collapse of the skin region under pressure, said skin region being capable of selectively permeating a more readily permeable component of a feed mixture to be separated at a desirably high permeation rate, said membrane having washed and dried, and having been exposed in essentially dry form to an elevated temperature of from about 15° C. to about 1° C. less than the glass transition temperature of the membrane material under non-swelling conditions for a period of time sufficient to modify the membrane structure to create asymmetry therein and to increase its compaction resistance and collapse pressure, whereby said asymmetric membrane exhibits enhanced selectivity and permeability characteristics, and advantageous combinations of selectivity and permeability, together with desirable compaction resistance and collapse pressure, on a repeatable basis, enhancing the uniformity and reliability of the membrane for use in gas separation operations.

2. The membrane of claim 1 in which the membrane material comprises polysulfone.

3. The membrane of claim 1 in which said desired form comprises hollow fiber form.

4. The membrane of claim 1 in which said non-swelling conditions comprise a heated gas atmosphere.

5. The membrane of claim 1 in which said heated gas atmosphere comprises hot, essentially dry air.

6. The membrane of claim 1 in which said non swelling conditions comprise a bath of non-swelling liquid, the exposure of said membrane thereto being for a period of time not sufficient to cause the collapse of said membrane.

7. In the process of preparing a polymeric membrane capable of selectively permeating a more readily permeable component of a feed gas mixture in which said membrane is produced in a desired porous form, washed and dried, the improvement comprising exposing said membrane in essentially dry form to an elevated temperature of from about 15° C. to about 1° C. less than the glass transition temperature of the membrane material under non-swelling conditions for a period of time sufficient to modify the membrane structure to form asymmetry therein, with increased compaction resistance and collapse pressure, whereby the uniformity and reliability of the treated membrane is enhanced for use in gas separation operations.

8. The process of claim 7 in which said non swelling conditions comprise a heated gas atmosphere.

9. The process of claim 8 in which the membrane is exposed to said elevated temperature for a period of from about 5 seconds to about 5 minutes.

10. The process of claim 9 in which said period of time is from about 30 seconds to about 4 minutes.

11. The process of claim 7 in which said polymeric membrane comprises polysulfone.

12. The process of claim 7 in which said heated gas atmosphere comprises hot, essentially dry air.

13. The process of claim 7 in which the membrane is exposed to said elevated temperature under non-swelling conditions by passing the membrane through a bath of non swelling liquid for a period of time not sufficient to cause the collapse of said membrane.

14. The process of claim 3 in which said non-swelling liquid comprises silicone oil, and including washing and drying the treated membrane.

15. The process of claim 14 in which said treated membrane is in hollow fiber form.

* * * * *